US008762937B2

(12) United States Patent
Berg et al.

(10) Patent No.: US 8,762,937 B2
(45) Date of Patent: Jun. 24, 2014

(54) MODEL DRIVEN DEPLOYMENT OF COMPOSITE APPLICATIONS

(75) Inventors: Daniel C. Berg, Research Triangle Park, NC (US); Brad L. Blancett, Raleigh, NC (US); Michael D. Elder, Durham, NC (US); Chad M. Holliday, Holly Springs, NC (US); Alexander V. Konstantinou, Hawthorne, NY (US); Timothy A. Pouyer, Greenville, SC (US); Edward C. Snible, Hawthorne, NY (US); Hendra Suwanda, Ontario (CA); John E. Swanke, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 13/526,142

(22) Filed: Jun. 18, 2012

(65) Prior Publication Data

US 2012/0260245 A1 Oct. 11, 2012

Related U.S. Application Data

(60) Division of application No. 12/828,270, filed on Jun. 30, 2010, now Pat. No. 8,595,693, which is a continuation-in-part of application No. 12/181,737, filed on Jul. 29, 2008, now Pat. No. 8,291,378.

(51) Int. Cl.
*G06F 9/44* (2006.01)

(52) U.S. Cl.
USPC ............ 717/107; 717/104; 717/106; 717/108

(58) Field of Classification Search
None
See application file for complete search history.

(56) References Cited

U.S. PATENT DOCUMENTS

| 7,210,143 | B2 * | 4/2007 | Or et al. ........................ 717/174 |
| 7,240,325 | B2 * | 7/2007 | Keller .......................... 717/104 |
| 7,478,361 | B2 * | 1/2009 | Peteanu et al. ................ 717/102 |
| 7,665,085 | B2 * | 2/2010 | Sundararajan et al. ....... 717/174 |
| 7,996,814 | B1 * | 8/2011 | Qureshi et al. ................ 717/120 |
| 8,024,733 | B2 * | 9/2011 | Hambrick et al. ............. 718/101 |
| 8,037,471 | B2 * | 10/2011 | Keller et al. .................. 717/174 |
| 8,244,696 | B2 * | 8/2012 | Salgar et al. .................. 707/695 |
| 8,306,996 | B2 * | 11/2012 | Nanjangud Bhaskar et al. ............................ 707/770 |
| 2005/0102665 | A1 * | 5/2005 | Barta et al. ................... 717/174 |
| 2005/0283759 | A1 * | 12/2005 | Peteanu et al. ................ 717/120 |
| 2006/0005162 | A1 * | 1/2006 | Tseng et al. .................. 717/107 |
| 2006/0106590 | A1 * | 5/2006 | Tseng et al. .................... 703/20 |
| 2007/0005311 | A1 * | 1/2007 | Wegerich et al. ................ 703/2 |
| 2007/0055972 | A1 * | 3/2007 | Brown et al. ................. 717/174 |
| 2007/0157191 | A1 * | 7/2007 | Seeger et al. ................. 717/168 |
| 2009/0049438 | A1 * | 2/2009 | Draper et al. ................. 717/168 |

(Continued)

*Primary Examiner* — Isaac Tecklu
(74) *Attorney, Agent, or Firm* — Steven M. Greenberg, Esq.; CRGO Law

(57) ABSTRACT

Embodiments of the present invention provide a method, system and computer program product for model driven deployment of component based applications. In an embodiment of the invention, a method for model driven deployment of component based applications can include selecting units representative of corresponding programmatic objects to be deployed into a target environment and specifying a deployment topology for the target environment. The method also can include matching portions of the units to different automation signatures and filtering the different automation signatures to a set of automation signatures based upon the deployment topology. The set of automation signatures can be ordered according to known dependencies of a corresponding deployment model and the ordered set of automation signatures can be bundled into an automation workflow and published to an automation engine for execution to deploy the programmatic objects into the target environment.

4 Claims, 2 Drawing Sheets

(56) References Cited

U.S. PATENT DOCUMENTS

| | | | |
|---|---|---|---|
| 2009/0265683 A1* | 10/2009 | Salgar et al. | 717/104 |
| 2010/0031247 A1* | 2/2010 | Arnold et al. | 717/174 |
| 2010/0070449 A1* | 3/2010 | Arnold et al. | 706/48 |
| 2011/0004564 A1* | 1/2011 | Rolia et al. | 705/348 |
| 2011/0029673 A1* | 2/2011 | Jaisinghani | 709/226 |
| 2011/0029967 A1* | 2/2011 | Berg et al. | 717/175 |
| 2012/0005646 A1* | 1/2012 | Manglik et al. | 717/105 |
| 2012/0117559 A1* | 5/2012 | Vorthmann et al. | 717/177 |
| 2012/0192146 A1* | 7/2012 | Arnold et al. | 717/105 |
| 2012/0260245 A1* | 10/2012 | Berg et al. | 717/174 |

* cited by examiner

MODEL DRIVEN DEPLOYMENT OF COMPOSITE APPLICATIONS

CROSS-REFERENCE TO RELATED APPLICATIONS

This application is a Divisional of U.S. application Ser. No. 12/828,270, filed Jun. 30, 2010, which is a continuation-in-part of U.S. application Ser. No. 12/181,737, filed Jul. 29, 2008, the entirety of which is incorporated herein by reference.

BACKGROUND OF THE INVENTION

1. Field of the Invention

The present invention relates to application deployment and more particularly to script driven deployment of composite applications.

2. Description of the Related Art

Component-based software engineering is a branch of software engineering that emphasizes the separation of concerns in respect of the wide-ranging functionality available throughout a given software system. An individual component is a software package or a module that encapsulates a set of related functions or data. All system processes are placed into separate components so that all of the data and functions inside each component are semantically related. Because of this principle, it is often said that components are modular and cohesive. With regard to system-wide co-ordination, components communicate with each other via interfaces. When a component offers services to the rest of the system, it adopts a provided interface which specifies the services that can be utilized by other components and how. This interface can be seen as a signature of the component—the client does not need to know about the inner workings of the component (implementation) in order to make use of it. This principle results in components referred to as encapsulated.

Components generally execute within a container provided by an application server. Different components can depend upon the presence of other components and resourced within a container. Consequently, deploying a component based application to a target environment mandates the presence of all dependencies requisite to the operation of the component based application, and also the proper selection of a container version, and yet further a proper configuration of the container and perhaps the application server and supporting host computer, itself. The complexity then of deploying a component based application to a target environment far exceeds that of the deployment of traditional binaries to a personal computer or server.

To address the complex nature of deploying a component based application to multiple different target environments, developers often formulate deployment scripts intended to partially automate the deployment process. The development of a deployment script, in of itself, can be complicated and costly, however. Further, the development of the deployment script can be closely related to the subject component based application to be deployed and thus, every application to be deployed enjoys its own, custom developed deployment script—an enormously inefficient outcome.

BRIEF SUMMARY OF THE INVENTION

Embodiments of the present invention address deficiencies of the art in respect to deployment script development and provide a novel and non-obvious method, system and computer program product for model driven deployment of component based applications. In an embodiment of the invention, a method for model driven deployment of component based applications can include selecting units representative of corresponding programmatic objects to be deployed into a target environment and specifying a deployment topology for the target environment. The method also can include matching portions of the units to different automation signatures and filtering the different automation signatures to a set of automation signatures based upon the deployment topology. The set of automation signatures can be ordered according to known dependencies of a corresponding deployment model and the ordered set of automation signatures can be bundled into an automation workflow and published to an automation engine for execution to deploy the programmatic objects into the target environment.

In another embodiment of the invention, a deployment data processing system can be configured for model driven deployment of component based applications. The system can include a host server with at least one processor and memory, coupled to different target environments over a computer communications network. The system also can include a data store of one or more databases coupled to the host server that includes automation signatures and units individually representative of underlying programmatic objects. Of note, each automation signature can include a deployment model, a parameter list of parameters bound to elements in the deployment model, and a script identifier identifying a script operative to deploy a specified programmatic object to a target environment using parameters set forth in the parameter list.

Finally, the system can include a development environment executing in the memory of the host server and a model drive deployment module coupled to the development environment. The module can include program code enabled to match portions of selected ones of the units to different automation signatures, to filter the different automation signatures to a set of automation signatures based upon an established deployment topology, to order the set of automation signatures according to known dependencies of a corresponding deployment model, and to bundle the ordered set of automation signatures into an automation workflow and publish the automation workflow to an automation engine for execution to deploy the programmatic objects into a selected one of the target environments.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for model driven deployment of component based applications. In accordance with an embodiment of the invention, different automation signatures can be established, each including a deployment model for deploying a program object to a target environment, a list of parameters for the deployment, a corresponding set of bindings between the parameters and elements of the deployment model, and a script identifier identifying a programmatic script operative to deploy the program object to the target environment with the parameters of the list. Different unit representations of underlying program objects can be mapped to corresponding ones of the automation signatures and the mapped automation signatures further can be limited to a set of automation signatures compatible with a deployment topology for a specified target environment. Thereafter, the set of automation signatures can be ordered according to known dependencies between the respective deployment models and packaged in an automation workflow. Finally, the automation workflow can be published to an automation engine for execution in deploying the program objects into the target environment.

Figure 1:
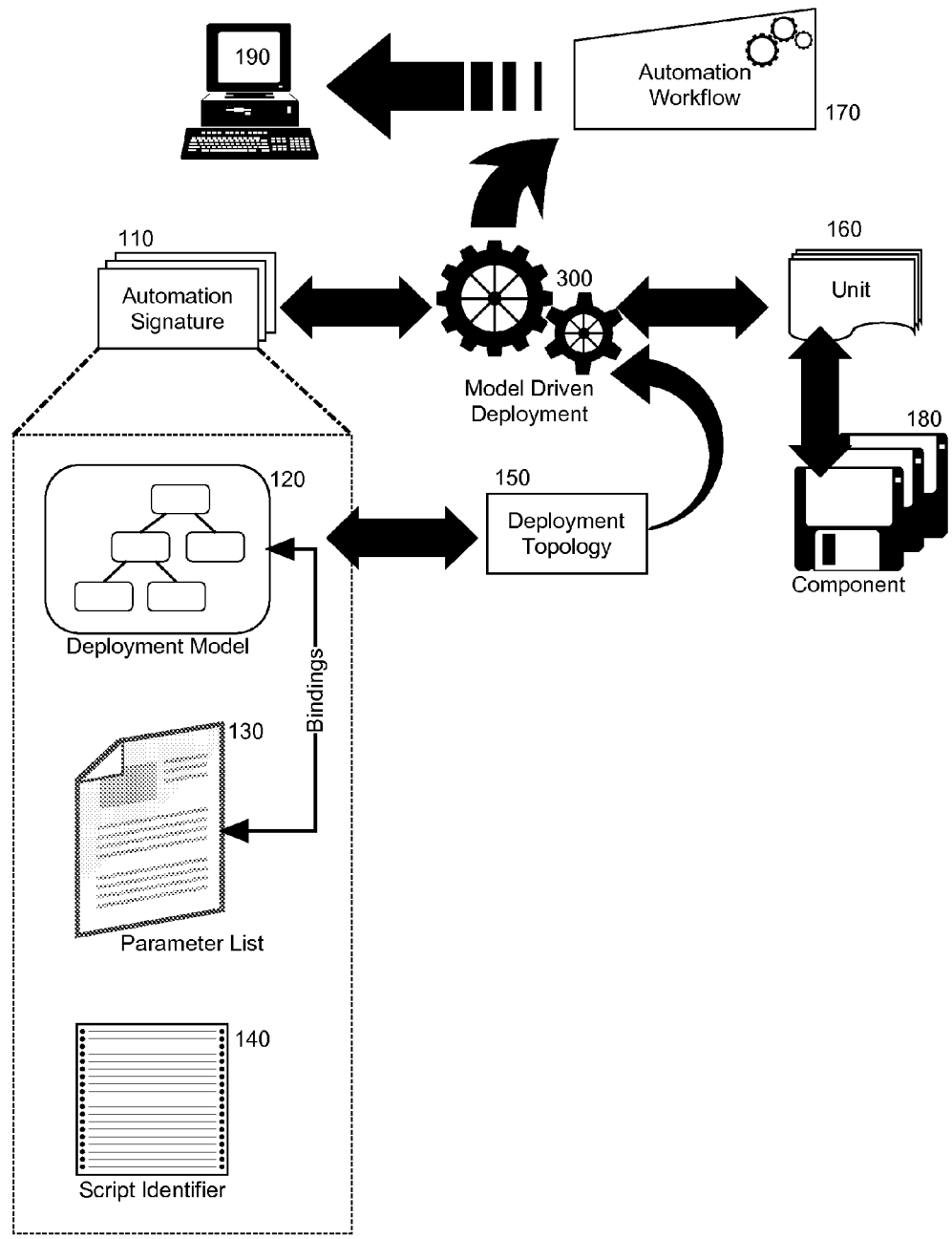
FIG. 1 is a pictorial illustration of a process for model driven deployment of component based applications.

In further illustration, FIG. 1 pictorially shows a process for model driven deployment of component based applications. As shown in FIG. 1, different automation signatures 110 can be established. Each automation signature 110 can include a deployment model 120, parameter list 130 and script identifier 140. Elements of the deployment model 120 can be bound to parameters in the parameter list 130 by way of bindings and the script identifier 140 can reference an external programmatic script operative to deploy one or more program objects to a target environments according to the programming model 120 and parameters provided within the parameter list 130.

A deployment topology 150 can be described for a target environment 190 into which one or more components 180 are to be deployed. The components 180 can be represented in the abstract by corresponding units 160. Model driven deployment logic 300 can match each of the units 160 to one or more of the automation signatures 110 by reference to the respective deployment models 120 and parameter lists 130 consistent with the requirements of the units 160. A deployment topology 150 can be specified for the target environment 190 and can be used by the model driven deployment logic 300 to filter the matched ones of the automation signatures 110 to a set of automation signatures 110 suitable for deploying the corresponding components 180 to the target environment 190.

Thereafter, the set of automation signatures 110 can be ordered according to known dependencies of the respective deployment models 120 and packaged into an automation workflow 170. Finally, execution of the automation workflow 170 can result in the execution of the programmatic scripts referenced by the script identifiers 140 of the ordered set of automation signatures 110 in order to deploy the components 180 into the target environment 190. In this way, the process of deploying components into a target environment can be both automated while remaining extensible so as to gain efficiencies in the use and reuse of deployment scripts for component based applications.

Figure 2:
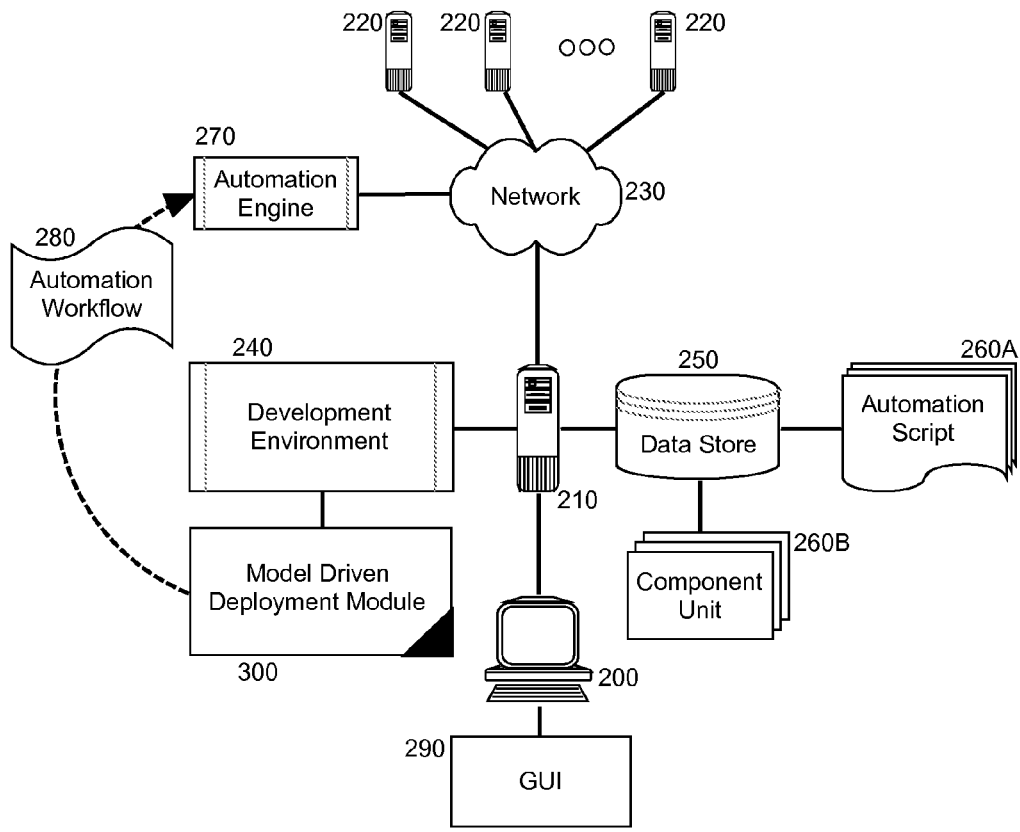
FIG. 2 is a schematic illustration of a deployment data processing system configured for model driven deployment of component based applications; and, FIG. 3 is a flow chart illustrating a process for model driven deployment of component based applications.

The process described in connection with FIG. 1 can be implemented within a deployment data processing system. In this regard, FIG. 2 is a schematic illustration of a deployment data processing system configured for model driven deployment of component based applications. The system can include a host server 210 configured for communicative coupling to one or more target environments 220 over computer communications network 230. The host server 210 can be coupled to a data store 250 of both automation signatures 260A and component units 260B representative of programmatic objects to be deployed into one or more of the target environments 220.

The host server 210 can include at least one processor and memory and can support the operation of a development environment 240 in which model driven development of deployment scripts can be performed. A model driven deployment module 300 further can be coupled to the development environment 240 and can be accessed through graphical user interface 290 in communicatively linked computer 200. Through the graphical user interface 290, an end user can direct the model driven deployment module 300 to generate and publish an automation workflow 280 to an automation engine 270 which in turn can execute the automation workflow 280 to deploy a component based application to one or more of the target environments 220.

In particular, the model driven deployment module 300 can include program code that when executed by the host server 210 can match a selected set of units 260B to one or more of the automation signatures 260A. The program code of the model driven deployment module 300 further can be enabled upon execution to reduce the matched automation signatures 260A according to an established deployment topology of a target environment. Thereafter, the reduce set of automation signatures 260A can be ordered according to known dependencies therebetween and bundled into an automation workflow 280. Finally, the program code of the model driven deployment model 300 can be enabled to publish the automation workflow 280 to the automation engine 270 for execution in deploying underlying program objects into a target one of the target environments 220.

Figure 3:
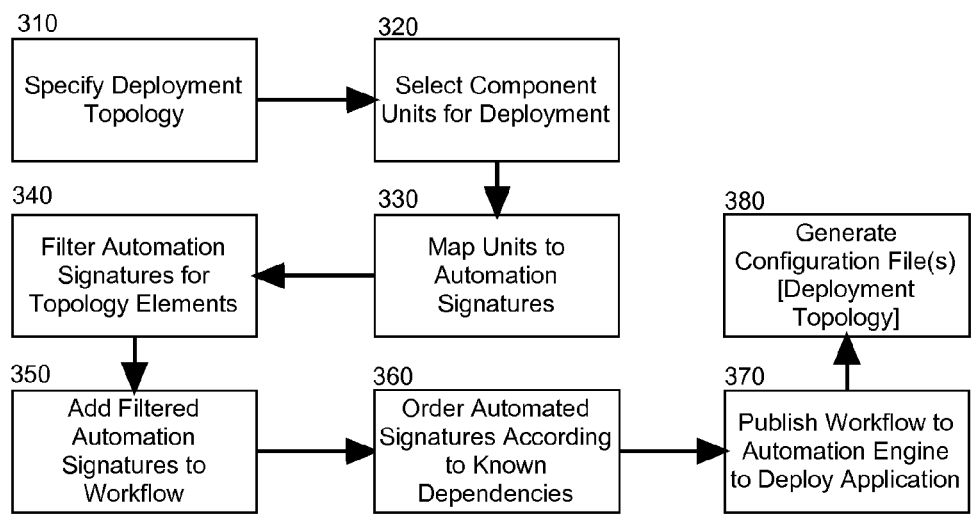

In yet further illustration of the operation of the model driven deployment module 300, FIG. 3 is a flow chart illustrating a process for model driven deployment of component based applications. Beginning in block 310, a deployment topology of a target environment can be specified and in block 320, a collection of units representative of underlying program objects can be selected for deployment into the target environment. In block 330, the units can be mapped to different automation signatures and the different automation signatures can be filtered to a set of automation signatures according to the elements of the deployment topology in block 340.

In block 350, the filtered set of automation signatures can placed into an automation workflow and in block 360, the automation signatures in the automation workflow can be ordered according to known dependencies set forth in the deployment models of the different automation signatures. Optionally, automation signatures in the set able to be executed simultaneously with other automation signatures in the set can be specified. In block 370, the automation workflow can be published to an automation engine configured to deploy the application. As yet another option, the automation workflow can be published to multiple different automation engines for coordinated execution. Finally, as an option, in block 380 one or more different configuration files can be generated for the automation workflow according to different target environments so as to afford reuse of the same automation workflow across the different target environments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for model driven deployment of component based applications, the method comprising:
    selecting a plurality of units representative of corresponding programmatic objects to be deployed into a target environment;
    specifying a deployment topology for the target environment;
    matching portions of the units to different automation signatures in a model driven deployment module executing in memory by at least one processor of a host computer and filtering the different automation signatures to a set of automation signatures based upon the deployment topology;
    ordering the set of automation signatures according to known dependencies of a corresponding deployment model; and,
    bundling the ordered set of automation signatures into an automation workflow and publishing the automation workflow to an automation engine for execution to deploy the programmatic objects into the target environment.

2. The method of claim 1, further comprising generating a plurality of configuration files separate from the automation workflow for different target environments.

3. The method of claim 1, wherein each automation signature comprises a deployment model, a parameter list of parameters bound to elements in the deployment model, and a script identifier identifying a script operative to deploy a specified programmatic object to a target environment using parameters set forth in the parameter list.

4. The method of claim 1, wherein ordering the set of automation signatures according to known dependencies of a corresponding deployment model, comprises:
    ordering the set of automation signatures according to known dependencies of a corresponding deployment model; and,
    specifying automation signatures in the set able to be executed simultaneously with other automation signatures in the set.

* * * * *